United States Patent [19]
Bohlen

[11] Patent Number: 6,118,197
[45] Date of Patent: Sep. 12, 2000

[54] APPARATUS AND METHODS FOR PROTECTING MOTOR FROM AIR BORNE CONTAMINANTS

[75] Inventor: John Bohlen, Ossian, Ind.

[73] Assignee: General Electric Company, Schenectady, N.Y.

[21] Appl. No.: 09/257,689

[22] Filed: Feb. 26, 1999

[51] Int. Cl.[7] ................................................. H02K 15/00
[52] U.S. Cl. .................... 310/89; 310/91; 29/596
[58] Field of Search ................................ 310/89, 91, 62, 310/63, 71, 68 A; 29/596; 62/507

[56] References Cited

U.S. PATENT DOCUMENTS

| | | | |
|---|---|---|---|
| 4,036,292 | 7/1977 | Hine, Jr. .................................. | 165/122 |
| 4,834,629 | 5/1989 | Tateishi ................................. | 310/68 A |
| 5,015,155 | 5/1991 | Brown .................................... | 417/360 |
| 5,019,735 | 5/1991 | Lee ......................................... | 310/89 |
| 5,117,656 | 6/1992 | Keck et al. .............................. | 62/506 |
| 5,430,338 | 7/1995 | McMillan et al. ....................... | 310/89 |
| 5,640,064 | 6/1997 | Boyd, Jr. et al. ....................... | 310/211 |
| 5,861,689 | 1/1999 | Snider et al. ............................ | 310/71 |
| 5,883,449 | 3/1999 | Mehta et al. ............................ | 310/60 R |
| 5,925,954 | 7/1999 | Gillieron ................................. | 310/89 |

OTHER PUBLICATIONS

Sales Brochure displaying prior fan motor enclosure, date?, 1 pg.

*Primary Examiner*—Nestor Ramirez
*Assistant Examiner*—Joseph Waks
*Attorney, Agent, or Firm*—Carl Horton, Esq.; Damian Wasserbauer, Esq.; Armstrong Teasdale LLP

[57] ABSTRACT

A refrigerator condenser fan motor enclosure including a base and a cover is described. The base and cover forming a top and a bottom of the enclosure which protects the refrigerator condenser fan motor from exposure to air borne contaminants. The base includes a first leveled step and a second leveled step which are mechanically connected to stator laminations of the condenser fan motor, a ground terminal for the condenser fan motor, and mounting lugs which allow the enclosure to be mounted onto a refrigerator. The cover is attached by tabs which are inserted into slots in the base.

20 Claims, 5 Drawing Sheets

APPARATUS AND METHODS FOR PROTECTING MOTOR FROM AIR BORNE CONTAMINANTS

BACKGROUND OF THE INVENTION

This invention relates generally to enclosures and, more particularly, to a refrigerator condenser fan motor enclosure.

A refrigerator utilizes an evaporator in combination with a compressor, and a condenser to transfer heat from interior air in the refrigerator to a refrigerant fluid, and then to transfer the heat from the refrigerant fluid to exterior air surrounding the refrigerator. The evaporator is located at a top of the refrigerator while the compressor and condenser are located on a bottom of the refrigerator.

Due to the different operating environments, separate and differently manufactured motors are typically utilized to drive the evaporator fan and the condenser fan. The evaporator fan is located within the sealed freezer enclosure and the motor construction is skeletal leaving otherwise sensitive components open to the non-aggressive environment. Conversely, the condenser fan moves ambient air across the condenser coil and is prone to buildup of contaminants on the motor such as dirt and lint which may be found on the refrigerator floor. Because of the more severe environment the condenser fan motor must be more ruggedly constructed to prevent contaminants from entering the motor. Owing to the differences in construction, an evaporator fan motor is less costly to manufacture than a comparably rated condenser fan motor.

Components common to both motors are a stator and a rotor. The stator, which is a stationary component of the motor, is formed by stator laminations. The rotor, which is the rotational components of the motor, utilizes bearings surrounded by a lubricant to allow the rotor to properly function. The motor also includes electrical components which carry power to the motor components.

Contamination of the condenser fan motor bearings by lint and dirt may cause the motor to seize due to the lubricant being wicked away. Lint and dirt may also be located between the electrical components and the motor components and impede the proper operation of the motor.

Accordingly, it would be desirable to provide a lighter and more cost effective motor for utilization in the condenser. In addition, it would be desirable to provide air borne contaminant protection for the condenser fan motor.

BRIEF SUMMARY OF THE INVENTION

These and other objects may be attained by a condenser fan motor that includes a contaminant protection enclosure. An evaporator fan motor is utilized in place of the traditional condenser fan motor because it is lighter and more cost effective. The contaminant protection enclosure is attached to a stator and provides an integral ground terminal for the condenser fan motor.

More particularly, and in an exemplary embodiment, the enclosure includes a base which is attached to stator laminations of the motor. The enclosure further includes a cover which is mounted onto and provides an interference fit with the base. The cover utilizes a full perimeter lip to seal contaminant entry paths and semi-conical interferences ribs to provide the interference fit between the cover and the base. The base is formed from metal and the cover is formed from electrically insulating plastic. The cover also provides electrical insulation protection for standard alternating current voltage terminals. The base and the cover include large openings that allow for protrusion of a rotor shaft, and an oil well and cover assembly. These components may be mounted onto the refrigerator and accessed via these openings.

The above described condenser fan motor enclosure provides complete air borne contaminant protection for the condenser fan motor. The enclosure also provides protection for the condenser fan motor bearings and electrical components.

DETAILED DESCRIPTION OF THE INVENTION

Figure 1:
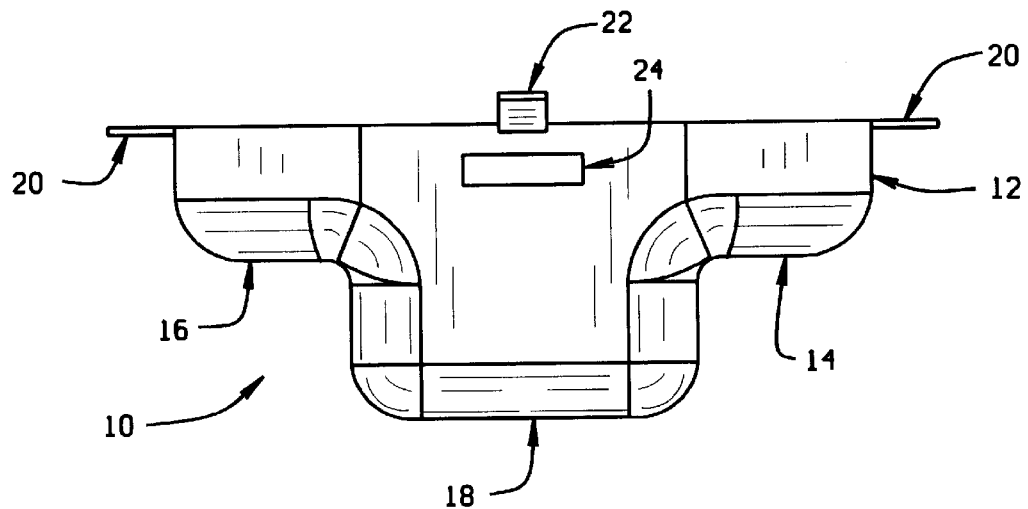
FIG. 1 is a bottom view of a base for a condenser fan motor enclosure.
Figure 5:
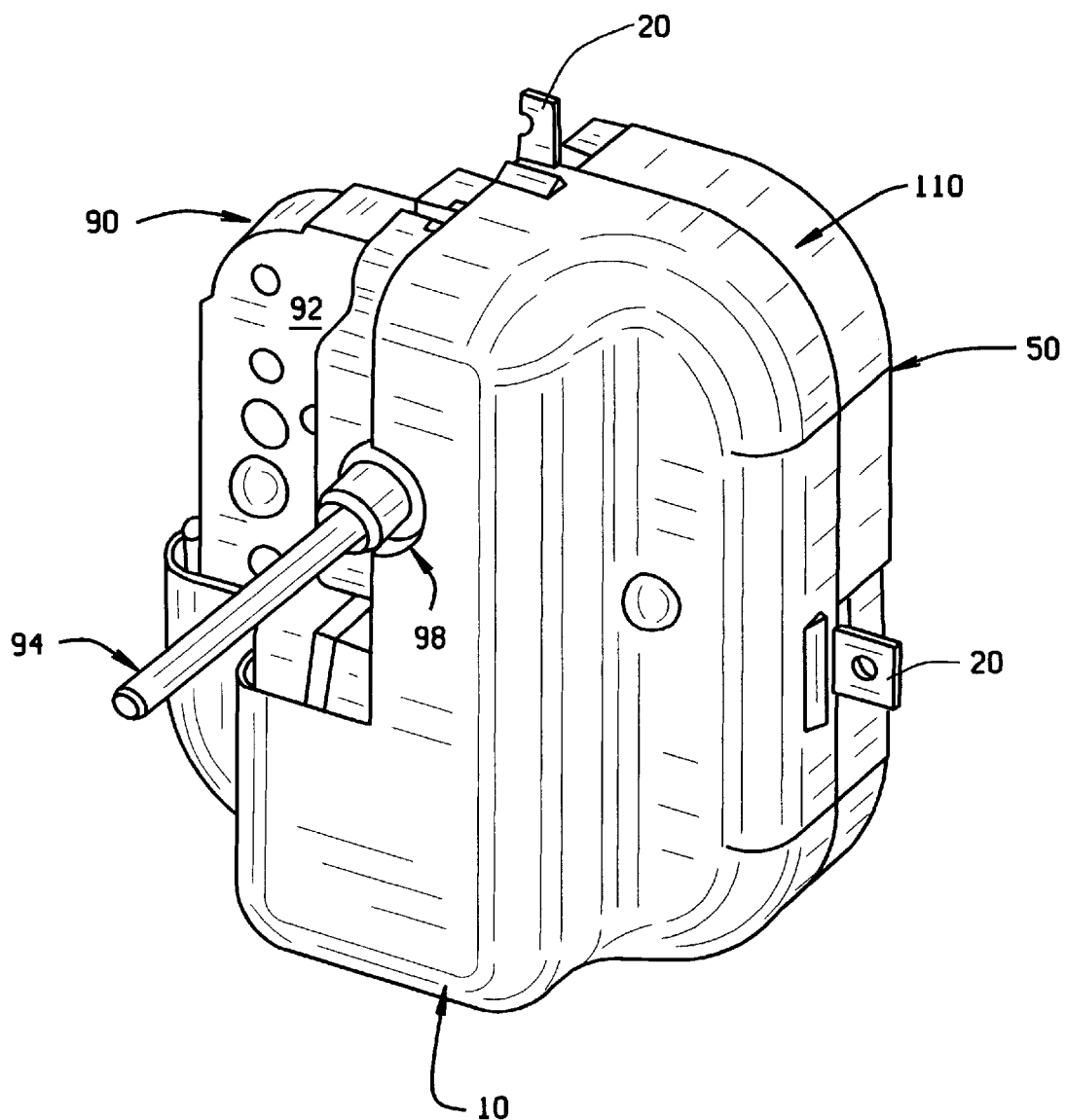
FIG. 5 is a cut-away rear view of the condenser fan motor including the base shown in FIG. 1 and the cover shown in FIG. 3.
Figure 6:
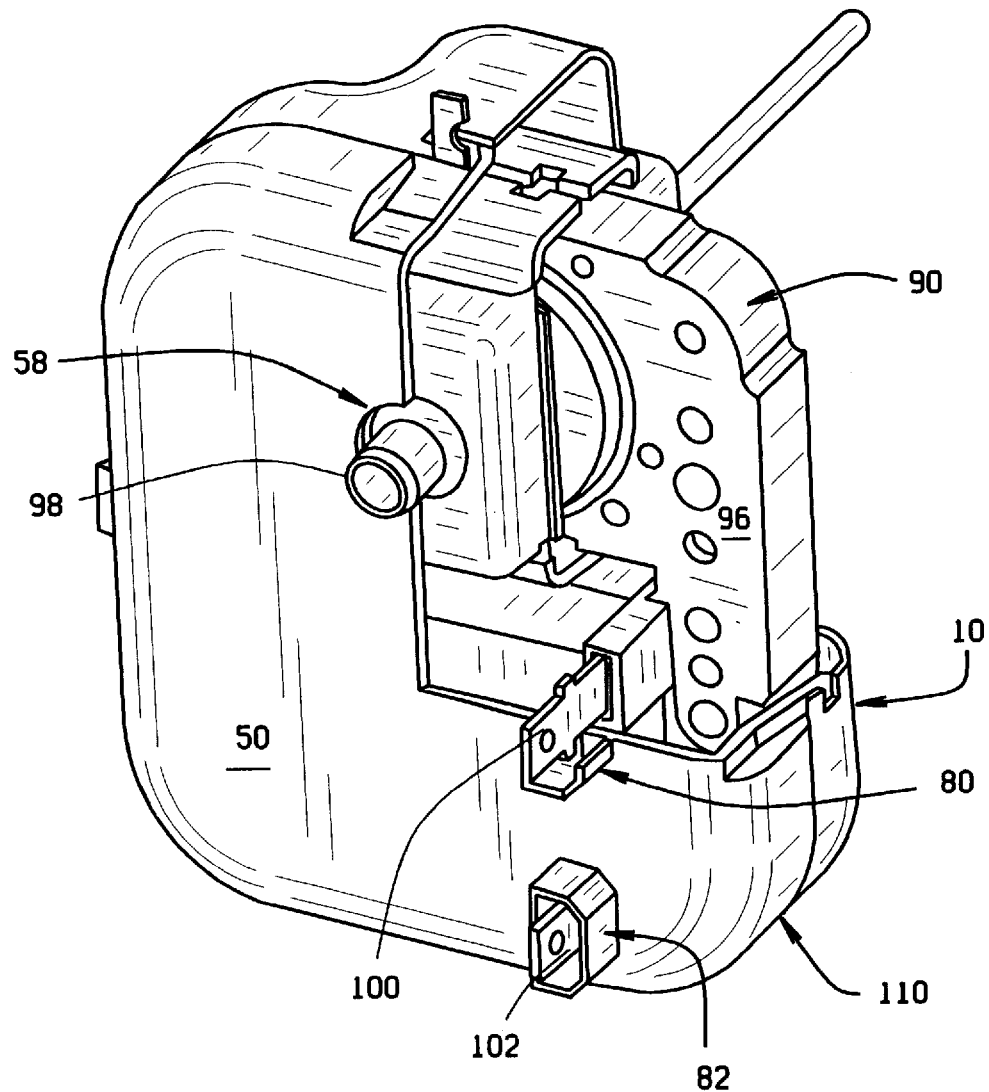
FIG. 6 is a cut-away front view of the condenser fan motor shown in FIG. 5.

FIG. 1 illustrates a base 10 for a condenser fan motor enclosure (shown in FIGS. 5 and 6). Base 10 includes a bottom 12 having a first portion 14 and a second portion 16, and a lowered section 18 extending from bottom 12. Lowered section 18 is positioned between first portion 14 and second portion 16 of bottom 12. Base 10 includes a plurality of mounting lugs 20 and at least one ground terminal 22. A plurality of openings 24 extend through base 10.

A condenser fan motor (shown in FIGS. 5 and 6) is fixedly attached to base 10 and may be mounted to a refrigerator (not shown) by mounting lugs 20. The condenser fan motor stator laminations are fixedly attached to base 10 at first portion 14 and second portion 16. Ground terminal 22 is provided because base 10 forms a bottom portion of the condenser fan motor.

Figure 2:
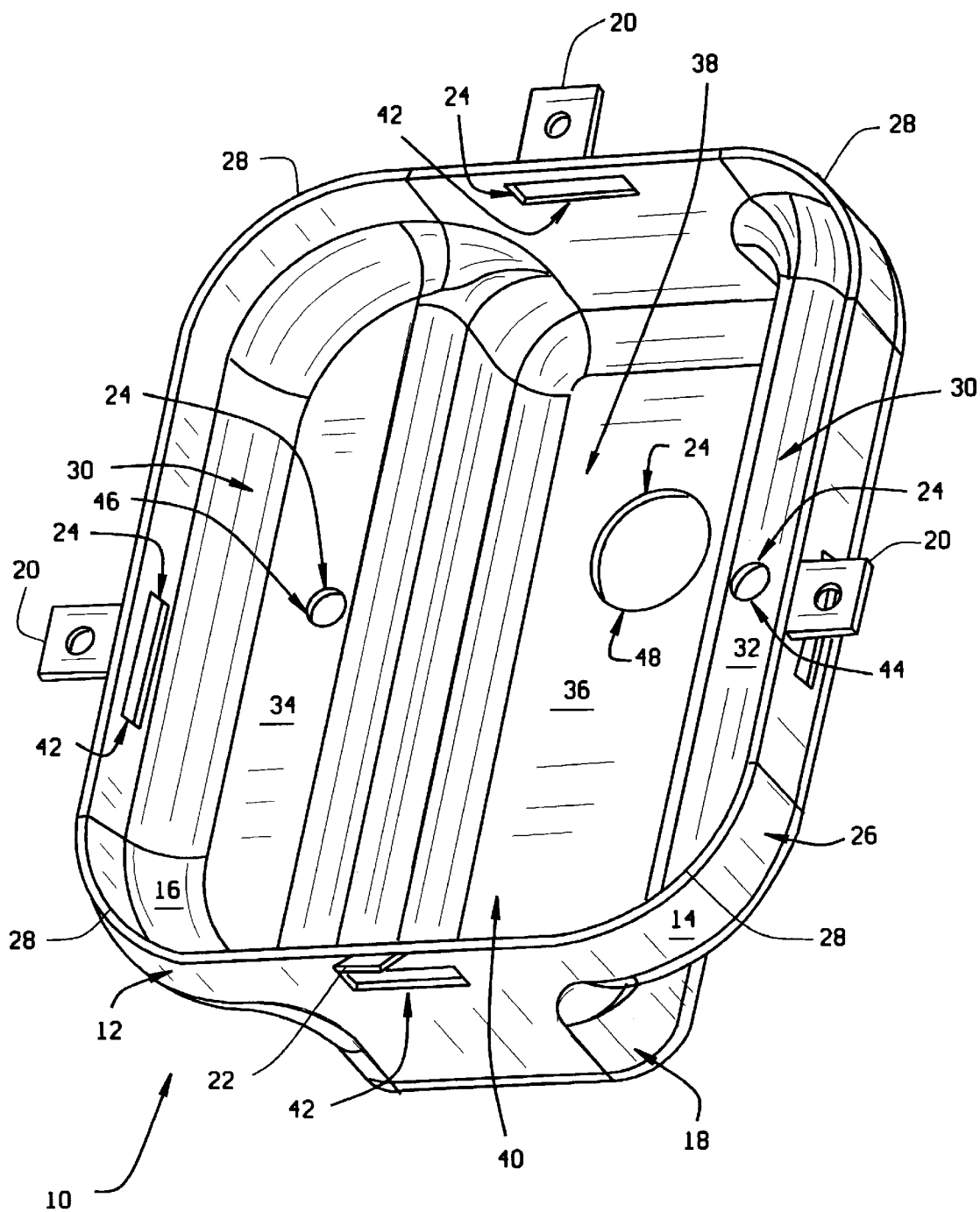
FIG. 2 is a perspective view of the motor enclosure base shown in FIG. 1.

FIG. 2 is a perspective illustration of base 10. As shown in FIG. 2, base 10 includes a first side wall 26 which is unitary with bottom 12. First side wall 26 has four rounded corners 28. A first recessed cavity 30 is formed by bottom 12 and first side wall 26.

A first substantially flat surface, or leveled step, 32 and a second substantially flat surface, or leveled step, 34 are formed in first portion 14 and second portion 16, respectively, of bottom 12. A third substantially flat surface, or leveled step, 36 is formed in lowered section 18 and forms a second recessed cavity 38. Second recessed cavity 38 extends from first recessed cavity 30 and forms a primary cavity 40 in bottom 12 of base 10.

Openings 24 which extend through base 10 include a plurality of slots 42 extending through first side wall 26. A first opening 44, a second opening 46, and a third opening 48 extend through first leveled step 32, second leveled step 34, and third leveled step 36, respectively. In one embodiment, openings 44, 46 and 48 are circular openings.

Once a condenser fan motor (shown in FIGS. 5 and 6) is inserted into base 10, a first side (shown in FIG. 5) of the condenser fan motor is enclosed within base 10. Third opening 48 allows a rotor shaft (shown in FIG. 5) of the condenser fan motor to extend through base 10 for connection to a condenser fan (not shown). Base 10 is mounted to a refrigerator (not shown) by mounting lugs 20. Stator laminations (not shown) of the condenser fan motor are fixedly attached to first leveled step 32 and second leveled step 34.

The stator laminations are mechanically fastened to base 10 by soldering, riveting, or gluing. Base 10, mounting lugs 20, and ground terminal 22 are composed of a galvanized steel which has a thickness of thirty-two thousandths (0.032) of an inch. Lint and dirt are prevented from coming into contact with the first side of the condenser fan motor by base 10.

Figure 3:
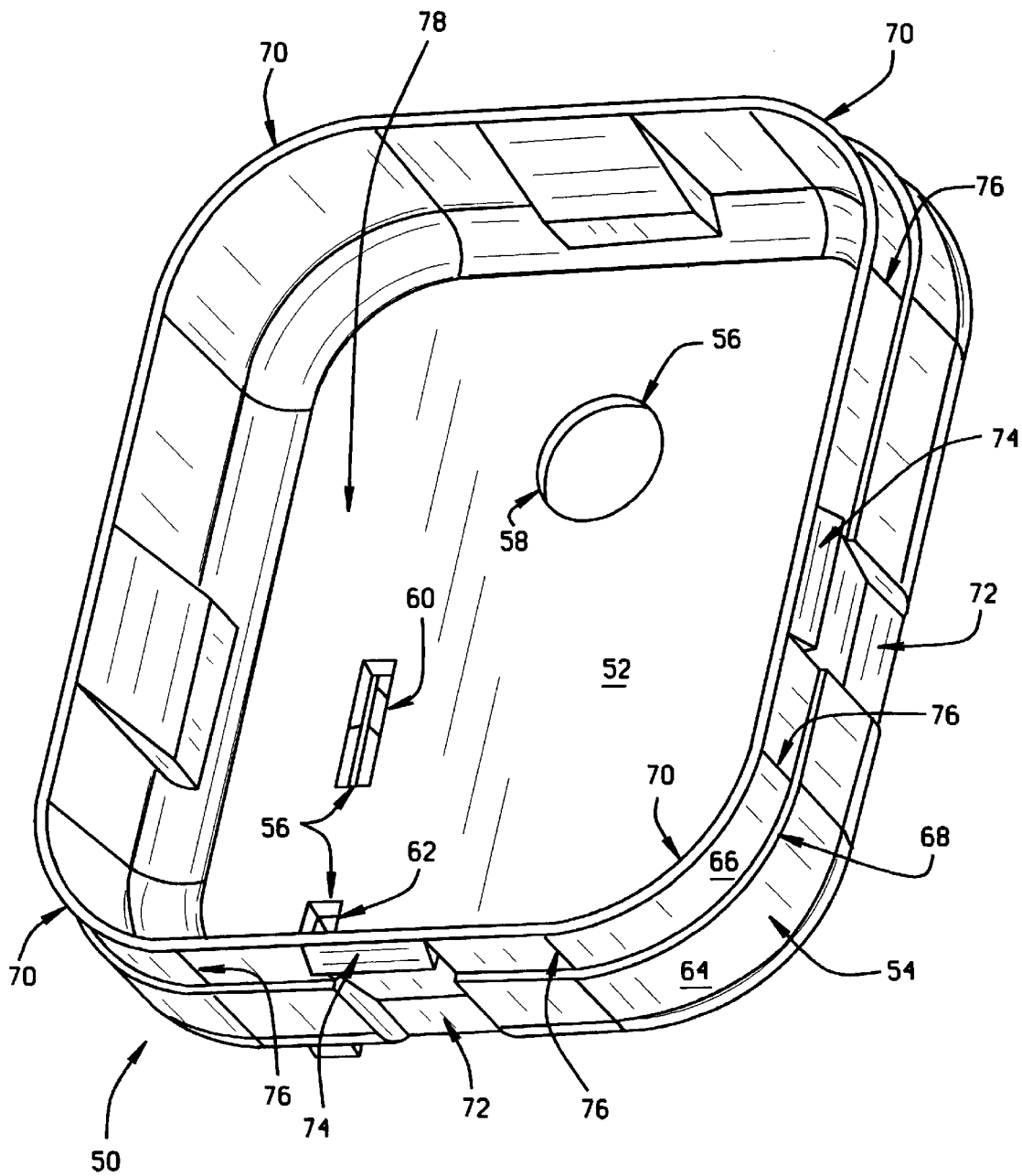
FIG. 3 is a perspective view of a cover for the condenser fan motor enclosure.

FIG. 3 is a perspective illustration of a cover 50 for a condenser fan motor enclosure (shown in FIGS. 5 and 6). Cover 50 includes a top 52 and a second side wall 54. A plurality of openings 56 extend through top 52 and includes at least one opening 58, a first slot 60, and a second slot 62. In one embodiment, opening 58 is a circular opening.

Second side wall 54 includes a first, upper, portion 64 separated from a second, lower, portion 66 by a lip 68. Second side wall 54 also includes four rounded corners 70 and a plurality of indentations 72. Second side wall 54 further includes a plurality of tabs 74 extending from, and adjacent to, indentations 72, and a plurality of semi-conical interference ribs 76 formed on second portion 66. A third recessed cavity, or a secondary cavity, 78 is formed by second side wall 54 and top 52 in cover 50.

Figure 4:
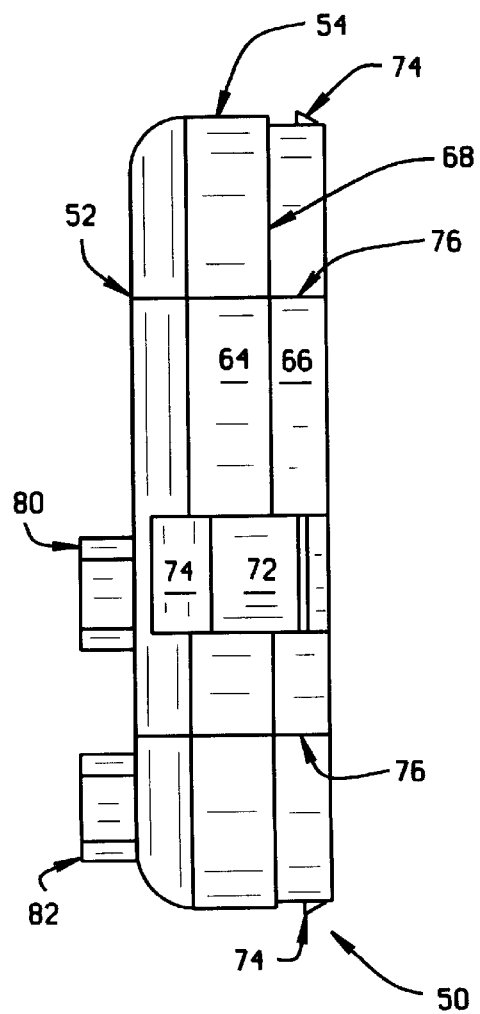
FIG. 4 is a side view of the motor cover enclosure shown in FIG. 3.

FIG. 4 is a side illustration of cover 50. As shown in FIG. 4, cover 50 further includes a first sheath 80 and a second sheath 82 connected to top 52. First sheath 80 and second sheath 82 are in flow communication with first slot 60 and second slot 62, respectively.

A condenser fan motor (shown in FIGS. 5 and 6) is inserted into, and a second side (shown in FIG. 6) of the condenser fan motor is enclosed within, cover 50. Opening 58 allows an oil well and an oil well cover (shown in FIG. 6) of the condenser fan motor to extend through cover 50 for easy access. Cover 50 is mounted on, and attached to, base 10 (shown in FIGS. 1, 2, 5, and 6) by inserting tabs 74 into slots 42 (shown in FIGS. 1 and 2) of base 10. Semi-conical interference ribs 76 form an interference fit between cover 50 and base 10. First sheath 80 and second sheath 82 provide air borne contaminant protection and insulation for standard alternating current voltage terminals (shown in FIG. 6) which are included on the condenser fan motor.

Lip 68 forms a full perimeter seal and prevents air borne contaminants from entering through the connection between cover 50 and base 10. Cover 50 and tabs 74 are composed of a plastic, Zytel FR50, commercially available from E.I. duPont Nemours and Company, Wilmington, Del. Lint and dirt are prevented from coming into contact with the second side of the condenser fan motor by cover 50.

FIGS. 5 and 6 are perspective cut-away rear and front illustrations of a refrigerator condenser fan motor 90 within an enclosure 110, respectively. As shown in FIG. 5, refrigerator condenser fan motor 90 includes a first side 92 and a rotor shaft 94. As shown in FIG. 6, refrigerator condenser fan motor 90 further includes a second side 96, an oil well and cover assembly 98, a first alternating voltage terminal 100, and a second alternating voltage terminal 102. Enclosure 110 includes base 10 and cover 50.

Condenser fan motor 90 is enclosed within base 10 and cover 50 of enclosure 110. Third opening 48 of base 10 allows rotor shaft 94 to extend through, and connect to, a condenser fan (not shown). Enclosure 110 may be mounted to a refrigerator (not shown) by mounting lugs 20 of base 10. Stator laminations (not shown) of condenser fan motor 90 are mechanically fastened to first leveled step 32 and second leveled step 34 (shown in FIG. 2).

Since base 10 of enclosure 110 forms a part of condenser fan motor 90, a ground terminal (shown in FIGS. 1 and 2) is provided for grounding motor 90. Circular opening 58 allows oil well and cover assembly 98 to extend through cover 50 for easy access. First sheath 80 and second sheath 82 provide air borne contaminant protection and insulation for first alternating voltage terminal 100, and second alternating voltage terminal 102, respectively. Lint and dirt are prevented from coming into contact with condenser fan motor 90 by enclosure 110.

Enclosure 110 is composed of easily assembled and snapped together base 10 and cover 50. Base 10 and cover 50 includes openings that allow protrusions of condenser fan motor 90 to be mounted onto the refrigerator. Base 10 includes an integral ground terminal and mounting lugs 20 for the use of condenser fan motor 90. Cover 50 is formed out of an insulating plastic and includes semiconical interference ribs and first sheath 80 and second sheath 82 to provide air borne contaminant protection and insulation for first alternating voltage terminal 100 and second alternating voltage terminal 102 of condenser fan motor 90.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An enclosure for a refrigerator condenser fan motor including a stator, a rotor, stator laminations, a first side, and a second side, said enclosure comprising:

a base fixedly attached to the stator laminations, said base enclosing the first side of the fan motor; and a cover mounted on said base, said cover enclosing the second side of the fan motor, said cover comprising a first portion, a lip, and a second portion, said first portion separated from said second portion by said lip.

2. An enclosure in accordance with claim 1 wherein a plurality of openings extend through said base and said cover.

3. An enclosure in accordance with claim 2 wherein said base comprises:

a first side wall having four rounded corners;

a bottom having a first portion and a second portion, said bottom unitary with said first side wall, said bottom forming a first recessed cavity; and a lowered section extending from said bottom, said lowered section positioned between said first portion and said second portion, said lowered section forming a second recessed cavity extending from said first recessed cavity.

4. An enclosure in accordance with claim 3 wherein said plurality of openings comprise a plurality of slots extending through said first side wall.

5. An enclosure in accordance with claim 3 wherein a plurality of mounting lugs and at least one ground terminal connect to said bottom.

6. An enclosure in accordance with claim 3 wherein said first portion and said second portion comprise a first substantially flat surface and a second substantially flat surface, respectively, said first substantially flat surface and said second substantially flat surface fixedly attached to the stator laminations.

7. An enclosure in accordance with claim 3 wherein said lowered section comprises a third substantially flat surface.

8. An enclosure in accordance with claim 6 wherein said plurality of openings comprise a first opening and a second opening extending through said first substantially flat surface and said second substantially flat surface, respectively.

9. An enclosure in accordance with claim 7 wherein said plurality of openings comprise a third opening extending through said third substantially flat surface.

10. An enclosure in accordance with claim 2 wherein said cover comprises:

a top unitary with said second side wall, said top and said second side wall forming a third recessed cavity; and a plurality of indentations formed in said second side wall, said second side wall having four rounded corners.

11. An enclosure in accordance with claim 10 wherein said second portion comprises a plurality of interference ribs.

12. An enclosure in accordance with claim 10 wherein said plurality of indentations comprise a plurality of tabs.

13. A refrigerator condenser fan motor comprising:

a rotor comprising a rotor shaft;

a stator comprising stator laminations, said rotor rotatably connected to said stator; an enclosure surrounding said stator and said rotor, said enclosure comprising a base comprising a bottom, said bottom comprising a first portion, a recess, and a second portion, said recess formed by said bottom between said first portion and said second portion, said first and second portion connected to said stator.

14. A refrigerator condenser fan motor in accordance with claim 13 wherein said enclosure comprises:

a base further comprising a first side wall comprising a plurality of slots extending therethrough, said base further comprising a first leveled step and a second leveled step, said first leveled step and said second leveled step connected to said first side wall and said stator laminations; and a cover comprising a top and a second side wall, said second side wall having a plurality of tabs extending therefrom, said tabs insert into said slots for connecting said second side wall to said first side wall.

15. A refrigerator condenser fan motor in accordance with claim 14 wherein said base further comprises:

a primary cavity formed by said bottom and said first side wall, said primary cavity further formed by said first leveled step, said second leveled step, and a third leveled step; and a plurality of openings extending through said bottom, said openings extending through said first leveled step, said second leveled step, and said third leveled step.

16. A refrigerator condenser fan motor in accordance with claim 15 wherein said base comprises a plurality of mounting lugs and a ground terminal, said mounting lugs and said ground terminal connected to said first side wall.

17. A refrigerator condenser fan motor in accordance with claim 14 wherein said cover further comprises:

a secondary cavity formed by said second side wall and said top;

at least one opening extending through said top;

a first slot and a second slot formed in said top; and a first sheath and a second sheath connected to said top, said first sheath and said second sheath in flow communication with said first slot and said second slot, respectively.

18. A refrigerator condenser fan motor in accordance with claim 17 said second side wall comprises:

an upper portion and a lower portion, said lower portion separated from said upper portion by a lip; and a plurality of semi-conical interference ribs formed on said lower portion.

19. A method for assembling a refrigerator condenser fan motor, the fan motor including a stator connected to a rotor, the stator including a plurality of stator laminations, and the rotor including a rotor shaft surrounded by bearings, and an enclosure including a base and a cover, the base having slots and including a first portion, a second portion, and a recess formed by the base between the first and second portions, the cover having tabs, said method comprising the steps of:

enclosing the refrigerator condenser fan motor within the base and the cover;

connecting the base to the stator laminations, such that the first portion and the second portion are attached to the stator laminations; and attaching the cover to the base.

20. A method in accordance to claim 19 wherein said step of attaching the cover to the base comprises the step of inserting the tabs formed in the cover within the slots formed in the base.

\* \* \* \* \*